United States Patent
Wakao (10) Patent No.: US 8,356,065 B2
(45) Date of Patent: Jan. 15, 2013

(54) SIMILAR TEXT SEARCH METHOD, SIMILAR TEXT SEARCH SYSTEM, AND SIMILAR TEXT SEARCH PROGRAM

(75) Inventor: Atsushi Wakao, Tokyo (JP)

(73) Assignee: NEC Corporation, Tokyo (JP)

( * ) Notice: Subject to any disclaimer, the term of this patent is extended or adjusted under 35 U.S.C. 154(b) by 1222 days.

(21) Appl. No.: 12/086,353

(22) PCT Filed: Dec. 12, 2006

(86) PCT No.: PCT/JP2006/325146
§ 371 (c)(1),
(2), (4) Date: Jun. 11, 2008

(87) PCT Pub. No.: WO2007/069762
PCT Pub. Date: Jun. 21, 2007

(65) Prior Publication Data
US 2010/0281091 A1  Nov. 4, 2010

(30) Foreign Application Priority Data

Dec. 12, 2005  (JP) .................................. 2005-358021

(51) Int. Cl.
*G06F 17/15* (2006.01)
(52) U.S. Cl. ....................................................... 708/422
(58) Field of Classification Search .................... 708/422
See application file for complete search history.

(56) References Cited

U.S. PATENT DOCUMENTS

| | | | | |
|---|---|---|---|---|
| 5,051,947 A | * | 9/1991 | Messenger et al. | 340/146.2 |
| 7,584,173 B2 | * | 9/2009 | Bax et al. | 707/999.003 |
| 2004/0220920 A1 | * | 11/2004 | Bax et al. | 707/3 |

FOREIGN PATENT DOCUMENTS

| | | |
|---|---|---|
| JP | 08-106474 | 4/1996 |
| JP | 2003-263430 A | 9/2003 |
| JP | 2004-038329 A | 2/2004 |

OTHER PUBLICATIONS

S. Furui et al., "Acoustic and Audio Engineering," 1992, 4 pages.

* cited by examiner

*Primary Examiner* — Tan V. Mai
(74) *Attorney, Agent, or Firm* — Foley & Lardner LLP (57) ABSTRACT

The similar sentence search system which ensures sufficient search accuracy in a search for similar sentences is provided, the system includes a similarity calculation unit having an input string storage unit which stores an input sentence and an example sentence, a local distance calculation unit which calculates local distances based on the strings stored by the input string storage unit, a local distance storage unit which stores local distances, a path determination unit which controls the calculation performed by the cumulative distance calculation unit based on the information on strings stored by the input string storage unit, a cumulative distance calculation unit which calculates a new cumulative distance based on the local distances and the cumulative distance stored by the cumulative distance storage unit and a cumulative distance storage unit which stores the cumulative distance.

12 Claims, 7 Drawing Sheets

|  | SHI | KYU | U | KA | SHI | TE | KU | DA | SA | I |
|---|---|---|---|---|---|---|---|---|---|---|
| KYU | 1 | 0 | 1 | 1 | 1 | 1 | 1 | 1 | 1 | 1 |
| U | 1 | 1 | 0 | 1 | 1 | 1 | 1 | 1 | 1 | 1 |
| KA | 1 | 1 | 1 | 0 | 1 | 1 | 1 | 1 | 1 | 1 |
| KU | 1 | 1 | 1 | 1 | 1 | 1 | 0 | 1 | 1 | 1 |
| DA | 1 | 1 | 1 | 1 | 1 | 1 | 1 | 0 | 1 | 1 |
| SA | 1 | 1 | 1 | 1 | 1 | 1 | 1 | 1 | 0 | 1 |
| I | 1 | 1 | 1 | 1 | 1 | 1 | 1 | 1 | 1 | 0 |

FIG. 6

|  | SHI | KYU | U | KA | SHI | TE | KU | DA | SA | I |
|---|---|---|---|---|---|---|---|---|---|---|
| KYU | 2 | 1 | 3 | 4 | 6 | 7 | 6 | 8 | 9 | 10 |
| U | 3 | 4 | 1 | 5 | 6 | 8 | 4 | 8 | 10 | 11 |
| KA | 4 | 5 | 6 | 1 | 7 | 8 | 5 | 6 | 10 | 12 |
| KU | 5 | 6 | 7 | 2 | 3 | 9 | 5 | 7 | 8 | 12 |
| DA | 6 | 7 | 8 | 3 | 4 | 5 | 6 | 5 | 9 | 10 |
| SA | 7 | 8 | 9 | 4 | 5 | 6 | 7 | 8 | 5 | 11 |
| I | 8 | 9 | 10 | 5 | 6 | 7 | 8 | 9 | 10 | 5 |

FIG. 7

|     | A | SU | WA | KYU | U | KA | KU | DA | SA | I |
|-----|---|----|----|-----|---|----|----|----|----|---|
| KYU | 1 | 1  | 1  | 0   | 1 | 1  | 1  | 1  | 1  | 1 |
| U   | 1 | 1  | 1  | 1   | 0 | 1  | 1  | 1  | 1  | 1 |
| KA  | 1 | 1  | 1  | 1   | 1 | 0  | 1  | 1  | 1  | 1 |
| KU  | 1 | 1  | 1  | 1   | 1 | 1  | 0  | 1  | 1  | 1 |
| DA  | 1 | 1  | 1  | 1   | 1 | 1  | 1  | 0  | 1  | 1 |
| SA  | 1 | 1  | 1  | 1   | 1 | 1  | 1  | 1  | 0  | 1 |
| I   | 1 | 1  | 1  | 1   | 1 | 1  | 1  | 1  | 1  | 0 |

FIG. 8

|     | A | SU | WA | KYU | U  | KA | KU | DA | SA | I  |
|-----|---|----|----|-----|----|----|----|----|----|----|
| KYU | 2 | 3  | 4  | 3   | 6  | 7  | 8  | 9  | 10 | 11 |
| U   | 3 | 4  | 5  | 4   | 3  | 8  | 9  | 10 | 11 | 12 |
| KA  | 4 | 5  | 6  | 5   | 6  | 3  | 10 | 11 | 12 | 13 |
| KU  | 5 | 6  | 7  | 6   | 7  | 8  | 3  | 12 | 13 | 14 |
| DA  | 6 | 7  | 8  | 7   | 8  | 9  | 4  | 3  | 14 | 15 |
| SA  | 7 | 8  | 9  | 8   | 9  | 10 | 5  | 6  | 3  | 16 |
| I   | 8 | 9  | 10 | 9   | 10 | 11 | 6  | 7  | 8  | 3  |

|     | SHI | KYU | U | KA | SHI | TE | KU | DA | SA | I |
|-----|-----|-----|---|----|-----|----|----|----|----|---|
| KYU | 2 | 1 | 2 | 3 | 4 | 5 | 6 | 7 | 8 | 9 |
| U   | 3 | 2 | 1 | 2 | 3 | 4 | 5 | 6 | 7 | 8 |
| KA  | 4 | 3 | 2 | 1 | 2 | 3 | 4 | 5 | 6 | 7 |
| KU  | 5 | 4 | 3 | 2 | 3 | 4 | 3 | 4 | 5 | 6 |
| DA  | 6 | 5 | 4 | 3 | 4 | 5 | 4 | 3 | 4 | 5 |
| SA  | 7 | 6 | 5 | 4 | 5 | 6 | 5 | 4 | 3 | 4 |
| I   | 8 | 7 | 6 | 5 | 6 | 7 | 4 | 5 | 4 | 3 |

FIG. 12

|     | SHI | KYU | U | KA | SHI | TE | KU | DA | SA | I |
|-----|-----|-----|---|----|-----|----|----|----|----|---|
| KYU | 2 | 1 | 2 | 3 | 4 | 5 | 6 | 7 | 8 | 9 |
| U   | 3 | 2 | 1 | 2 | 3 | 4 | 5 | 6 | 7 | 8 |
| KA  | 4 | 3 | 2 | 1 | 2 | 3 | 4 | 5 | 6 | 7 |
| KU  | 5 | 4 | 3 | 2 | 3 | 4 | 3 | 4 | 5 | 6 |
| DA  | 6 | 5 | 4 | 3 | 4 | 5 | 4 | 3 | 4 | 5 |
| SA  | 7 | 6 | 5 | 4 | 5 | 6 | 5 | 4 | 3 | 4 |
| I   | 8 | 7 | 6 | 5 | 6 | 7 | 4 | 5 | 4 | 3 |

FIG. 13

|     | A | SU | WA | KYU | U | KA | KU | DA | SA | I |
|-----|---|----|----|-----|---|----|----|----|----|---|
| KYU | 2 | 3 | 4 | 3 | 4 | 5 | 6 | 7 | 8 | 9 |
| U   | 3 | 4 | 5 | 4 | 3 | 4 | 5 | 6 | 7 | 8 |
| KA  | 4 | 5 | 6 | 5 | 4 | 3 | 4 | 5 | 6 | 7 |
| KU  | 5 | 6 | 7 | 6 | 5 | 4 | 3 | 4 | 5 | 6 |
| DA  | 6 | 7 | 8 | 7 | 6 | 5 | 4 | 3 | 4 | 5 |
| SA  | 7 | 8 | 9 | 8 | 7 | 6 | 5 | 4 | 3 | 4 |
| I   | 8 | 9 | 10 | 9 | 8 | 7 | 6 | 5 | 4 | 3 |

SIMILAR TEXT SEARCH METHOD, SIMILAR TEXT SEARCH SYSTEM, AND SIMILAR TEXT SEARCH PROGRAM

This application is the National Phase of PCT/JP2006/325146, filed Dec. 12, 2006, which claims priority to Japanese Application No. 2005-358021, filed Dec. 12, 2005, the disclosures of which are hereby incorporated by reference in their entirety.

TECHNICAL FIELD

The present invention relates to a similar text search method, a similar text search system and a similar text search program which search for similar text. The present invention also relates to a similar text search method, a similar text search system and a similar text search program which search for similar text through use of voice recognition results. The present invention further relates to a similarity calculation method, a similarity calculation system and a similarity calculation program which calculate similarities between strings.

BACKGROUND ART

One example of similar text search systems according to related arts is the one described in Patent Literature 1, which displays similar example sentences needed for translating an input sentence in an easy-to-see manner by grouping such similar example sentences. The similar text search system according to the related art described in Patent Literature 1 calculates the similarity between an input sentence and pre-accumulated example sentences by using a technique called "DP matching." The system then outputs similar example sentences based on the results of calculation for similarity. In a Non-Patent Literature 1, the technique "DP matching" is described.

Patent Literature 1: Japanese Patent Laying-Open No. 2006-106474 publication (paragraph 0016-0024, FIG. 3-4)

Figure 5:
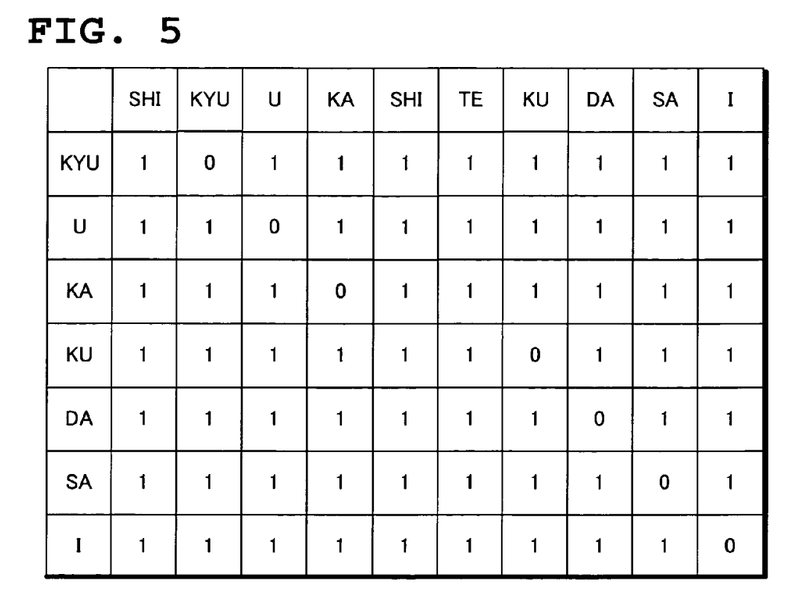
FIG. 5 is an illustrative diagram which shows examples of the calculation results of local distances obtained by the local distance calculation unit.

Non-Patent Literature 1: "Acoustic and Audio Engineering" by Sadaoki Furui, Kindai Kagakusha If the technique described in Non-Patent Literature 1 is used, a similarity can be obtained through DP matching by calculating the expression (1) (refer to the expression (14.14) on p. 184 in Non-Patent Literature 1).

$$g(i,j) = \min\{g(i,j-1)+d(i,j), g(i-1,j-1)+2d(i,j), g(i-1,j)+d(i,j)\} \quad \text{Expression (1)}$$

where in the expression (1), d(i, j) is the distance between the i-th element x [i] (1≦i≦I) in the sequence X and the j-th element y [j] (1≦j≦J) in the sequence Y (hereinafter also referred to as the "local distance"). Suppose, for example, X is a string "SHI KYU KA SHI TE KU DA SA I" (Lend me as soon as possible) and Y is a string "KA SHI TE KU DA SA I" (Lend me). FIG. 5 shows an example of local distances d (i, j) between the elements of the sequence X and the elements of the sequence Y. In the example shown in FIG. 5, d (i, j)=0 if x [i] and y [j] are the same character and d (i, j)=1 if otherwise.

As explained above, given local distances d (i, j), g (I, J) can be obtained by calculating the distance g (i, j) sequentially from g (1, 1) (hereinafter the distance g (i, j) will also be referred to as the "cumulative distance"). The value of g(I, J) thus obtained is the value which indicates the similarity between the two sequences X and Y.

Figure 1:
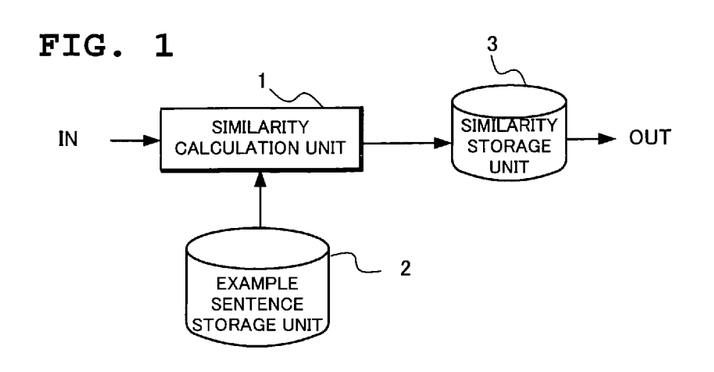
FIG. 1 is a block diagram showing an example configuration of a similar sentence search system according to an exemplary embodiment of the present invention.

Next, an example configuration of a similar text search system will be described with reference to the attached drawings. FIG. 1 is a block diagram showing an example configuration of a similar sentence search system. As shown in FIG. 1, the similar text search system includes a similarity calculation unit 1 which calculates the similarity between an input sentence and an example sentence, an example sentence storage unit 2 which stores example sentences to be searched and a similarity storage unit 3 which stores similarities calculated by the similarity calculation unit 1.

The similarity calculation unit 1 has functions to calculate the similarity between an input sentence and each of the example sentences stored by the example sentence storage unit 2 and to pass (or output) the resultant similarity to the similarity storage unit 3. The example sentence storage unit 2 has a function to pass (or output) the example sentences that it stores, one by one, to the similarity calculation unit 1. The similarity storage unit 3 has a function to store the similarities calculated by the similarity calculation unit 1. The similarity storage unit 3 also has a function to output example sentences with high stored similarities.

Figure 9:
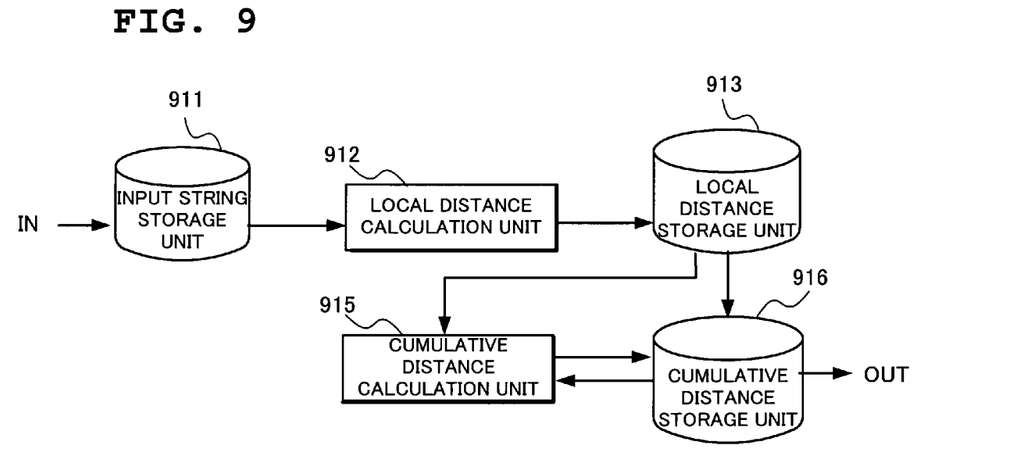
FIG. 9 is a block diagram showing an example configuration of the similarity calculation unit.

Next, the configuration of the similarity calculation unit 1 will be described. FIG. 9 is a block diagram showing an example configuration of the similarity calculation unit. As shown in FIG. 9, the similarity calculation unit 1 of the similar text search system includes an input string storage unit 911, a local distance calculation unit 912, a local distance storage unit 913, a cumulative distance calculation unit 915 and a cumulative distance storage unit 916.

The input string storage unit 911 stores an input sentence and an example sentence to be subjected to similarity calculation. The local distance calculation unit 912 has a function to calculate local distances d (i, j) based on the string stored by the input string storage unit 911. The local distance storage unit 913 stores the local distances d (i, j) calculated by the local distance calculation unit 912. The cumulative distance calculation unit 915 has a function to calculate a new g (i, j) based on the d (i, j) stored by the local distance storage unit 913 and the g (i, j) stored by the cumulative distance storage unit 916. The cumulative distance storage unit 916 stores the g (i, j) value calculated by the cumulative distance calculation unit 915.

In the example shown in FIG. 9, the input string storage unit 911 stores an input sentence and an example sentence to be subjected to similarity calculation, and the local distance calculation unit 912 calculates for all of the points (i, j) the local distance d (i, j) between each element of the input sentence and each element of the example sentence stored in the input string storage unit 911. The local distance storage unit 913 also stores all the d (i, j) values calculated by the local distance calculation unit 912. The cumulative distance calculation unit 915 sequentially calculates a new g (i, j) value based on the d (i, j) values stored by the local distance storage unit 913 and the g (i, j) values stored by the cumulative distance storage unit 916. The cumulative distance storage unit 916 then stores the g (i, j) values calculated by the cumulative distance calculation unit 915 and, on completion of calculating all of the g (i, j) values, outputs g (I, J) as the similarity between the input sentence and example sentence.

Figure 10:
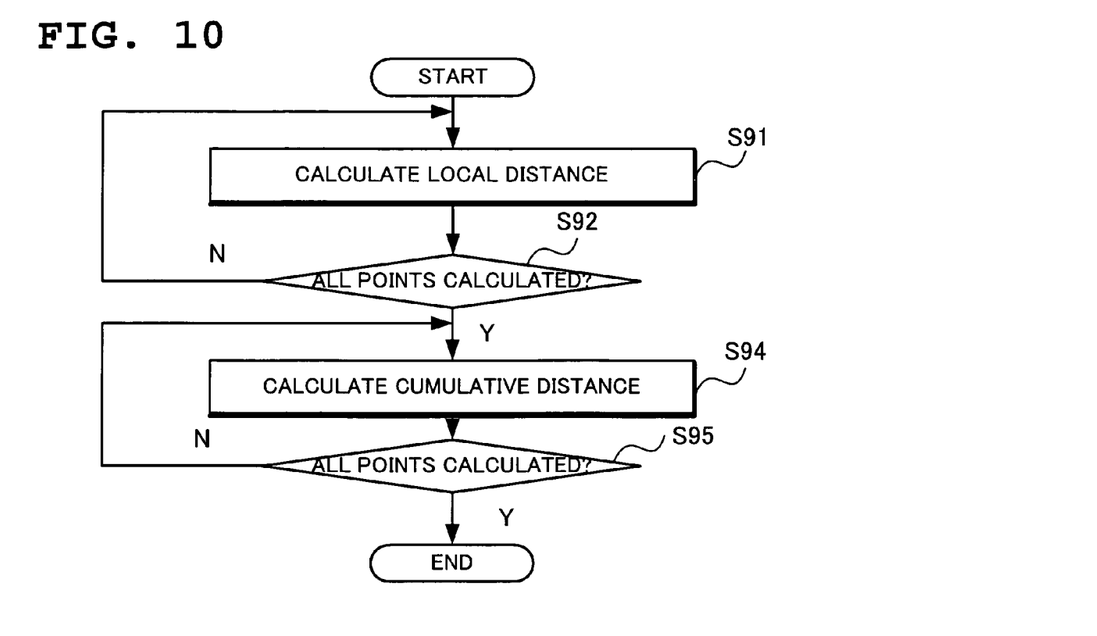
FIG. 10 is a flow chart which shows an example of the similarity calculation process performed by the similarity calculation unit to calculate the similarity between an input sentence and an example sentence.

Next, the operation of the similarity calculation unit 1 of the similar sentence search system will be described. FIG. 10 is a flow chart which shows an example of the similarity calculation process performed by the similarity calculation unit 1 to calculate the similarity between an input sentence and an example sentence. This example assumes that the similar text search system has a string "KYU U KA KU DA SA I" (Let me take a leave of absence) as an input sentence Y and a string "SHI KYU U KA SHI TE KU DA SA I" (Lend me as soon as possible) as an example sentence X. When the input sentences X and Y have been passed (inputted), the similarity calculation unit 1 temporarily stores the input sentences X and Y in the input string storage unit 911.

Next, the local distance calculation unit 912 calculates the local distance d (i, j) between each element x [i] of X and each element y [i] (Step S91 in FIG. 10). FIG. 5 is an illustrative diagram which shows examples of the calculation results of local distances obtained by the local distance calculation unit 912. The similar text search system stores all the calculation results as shown in FIG. 5 in the local distance storage unit 913. The local distance calculation unit 912 performs the local distance calculation on all of the points (i, j) which satisfy $1 \leq i \leq I$ and $1 \leq j \leq J$. In other words, the local distance calculation unit 912 repeats the process of Step S91 until all of the points have been calculated (Step S92 in FIG. 10).

Next, the cumulative distance calculation unit 915 calculates g (i, j) based on the expression (1) (Step S94 in FIG. 10). The similar text search system stores the results of calculating g (i, j) in the cumulative distance storage unit 916.

Figure 11:
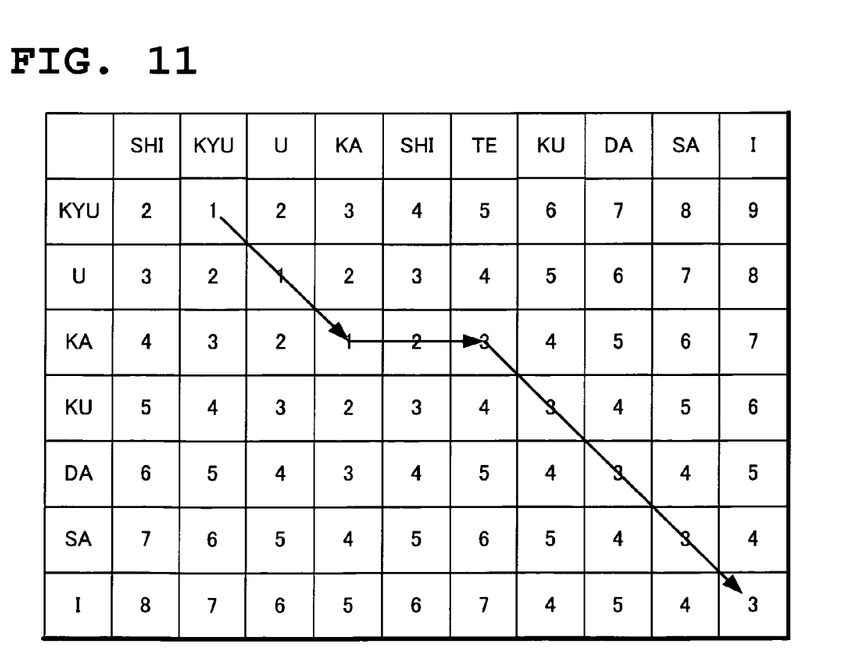
FIG. 11 is an illustrative diagram which shows an example of a DP path.

The path which follows the lowest selections in the expression (1) above inversely from g (I, J) is referred to as a "DP path." A DP path is a path which indicates partial correspondence between sequences X and Y identified during calculation of similarity. FIG. 11 is an illustrative diagram which shows an example of a DP path. In the example of FIG. 11, the path indicated by the arrows within the figure represents a DP path. In the example of FIG. 11, "KYU U" ("soon" in "as soon as") in X, for example, is corresponded by "KYU U" ("leave" in "leave of absence") in Y, while "KA SHI TE" (lend me) in X by "KA" ("absence" in "leave of absence") in Y.

In the calculation at Step S94 above, the cumulative distance calculation unit 915 calculates a new g (i, 1) value by sequentially incrementing "i" by 1 from g (1, 1). When g (I, 1) has been calculated, the cumulative distance calculation unit 915 returns calculation to i=1 and calculates a new g (i, 2) value by incrementing "j" by 1 and incrementing "i" by 1 from g (1, 2). Hereafter, the cumulative distance calculation unit 915 repeats the process of Step S94 until all of the g (i, j) values have been calculated (Step S95 in FIG. 13).

Figure 12:
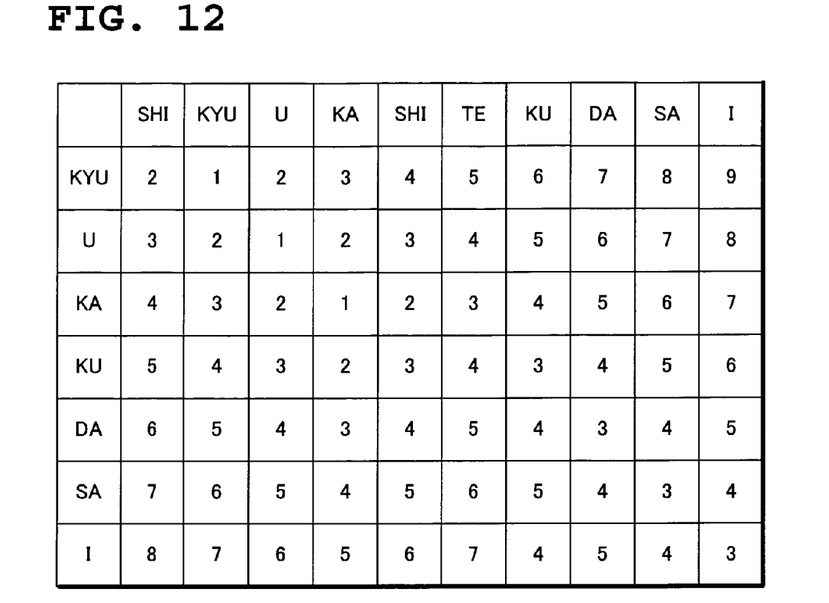
FIG. 12 is an illustrative diagram which shows examples of calculation results of g (i, j) obtained by the cumulative distance calculation unit.

FIG. 12 is an illustrative diagram which shows, examples of calculation results of g (i, j) obtained by the cumulative distance calculation unit 915. After all of the values of g (i, j) have been calculated, the cumulative distance storage unit 916 outputs the value"3" of g (I, J) (i.e., the value at the lowest-rightmost box shown in FIG. 12) as the similarity between "KYU U KA KU DA SA I" (Let me take a leave of absence) and "SHI KYU U KA SHI TE KU DA SA I" (Lend me as soon as possible).

Figure 7:
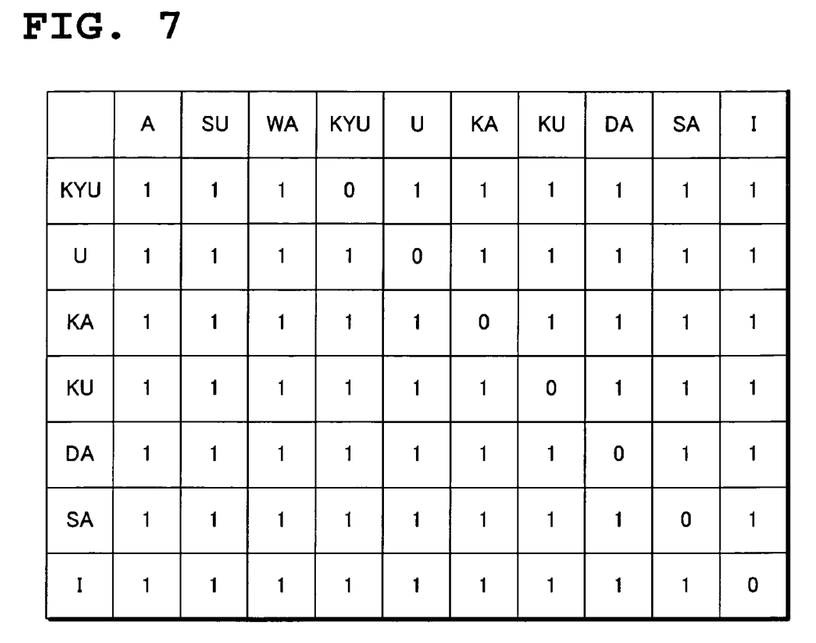
FIG. 7 is an illustrative diagram which shows other examples of calculation results of local distances obtained by the local distance calculation unit.
Figure 13:
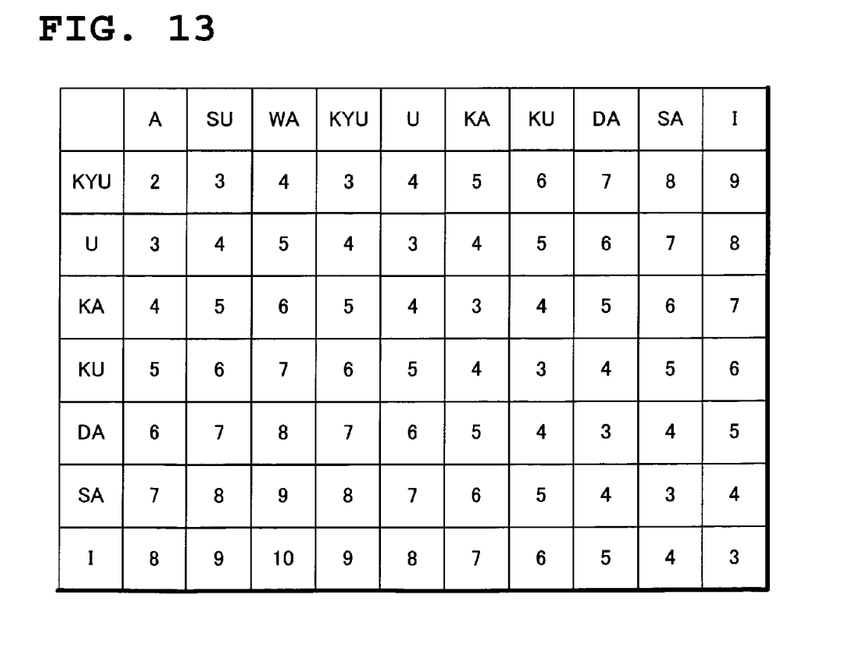
FIG. 13 is an illustrative diagram which shows other examples of calculation results of g (i, j) obtained by the cumulative distance calculation unit.

Similarly, it is assumed that the similar text search system has a string "KYU U KA KU DA SA I" (Let me take a leave of absence) as an input sentence Y and a string "A SU WA KYU U KA KU DA SA I" (Let me take a leave of absence tomorrow) as an example sentence X. When the input sentences X and Y have been passed (inputted), the local distance calculation unit 912 calculates the local distances d (i, j), as shown in FIG. 7. Also, the cumulative distance calculation unit 915 calculates the similarity g (i, j) as shown in FIG. 13, based on the d (i, j) values shown in FIG. 7. The cumulative distance storage unit 916 then outputs the value "3" of g (I, J) as the similarity between the input sentence X and Y described above.

However, even with a similarity search using the DP matching technique, it may always not be possible to properly determine the similarity between two input sentences. For example, in the example described above, when "KYU U KA KU DA SAI" (Let me take a leave of absence) and "SHI KYU U KA SHI TE KU DA SA I" (Lend me as soon as possible) are matched with each other (FIG. 13), "KA" in "KYU U KA" ("absence" in "leave of absence") and "KA SHI TE" (Lend me) were corresponded to each other, which is unnatural correspondence from a perspective of a semantic or grammatical delimitation. Therefore, cases may often occur in which the similarity between two relatively similar sentences, such as "KYU U KA KU DA SA I" (Let me take a leave of absence) and "A SU WA KYU U KA KU DA SA I" (Let me take a leave of absence tomorrow), is the same as the similarity between two non-similar sentences, such as "KYU U KA KU DA SA I" (Let me take a leave of absence) and "SHI KYU U KA SHI TE KU DA SA I" (Lend me as soon as possible.") In this example, both sentence pairs have a similarity of 3. In these cases, sufficient search accuracy will not be achieved by performing a similar sentence search using the similar text search system.

An object of the present invention is to provide a similar text search method, a similar text search system and a similar text search program which enable accurate search for similar sentences. Another object of the present invention is to provide a similar text calculation method, a similar text calculation system and a similar text calculation program which enable higher accuracy calculation of similarity.

SUMMARY

According to a first exemplary aspect of the present invention, a similarity calculation method includes the steps of, for two strings, calculating local distances which represent distances between characters which make up the two strings, switching the accumulation method to recursively accumulate the local distances, based on string delimiter position information which indicates delimiter positions previously added to the strings, and calculating the similarity between the strings by performing the process of recursively accumulating the local distances according to the switched accumulation method.

According to a second exemplary aspect of the present invention, a similar sentence search method includes the steps of, calculating local distances between characters which make up an input string and characters which make up a previously-accumulated example sentence string, switching the accumulation method to recursively accumulate the local distances, based on string delimiter position information which indicates delimiter positions previously added to the example sentence string, calculating the similarity between the input string and the example sentence string by performing the process of recursively accumulating the local distances according to the switched accumulation method, and obtaining the example sentence string whose obtained similarity is high as a search result.

According to a third exemplary aspect of the present invention, a similarity calculation system includes a local distance calculation unit which, for two strings, calculating local distances which represent distances between characters which make up the two strings, an accumulation method switching unit which switches the accumulation method to recursively accumulate the local distances calculated by the local distance calculation unit, based on string delimiter position information which indicates delimiter positions previously added to the strings, and an accumulation calculation unit which calculates the similarity between the strings by performing the process of recursively accumulating the local distances according to the accumulation method switched by the accumulation method switching unit.

According to a fourth exemplary aspect of the present invention, a similar sentence search system includes a local distance calculation unit which calculates local distances between characters which make up an input string and characters which make up a previously-accumulated example sentence string, an accumulation method switching unit which switches the accumulation method to recursively accumulate the local distances calculated by the local distance calculation unit, based on string delimiter position information which indicates delimiter positions previously added to the strings, an accumulation calculation unit which calculates the similarity between the strings by performing the process of recursively accumulating the local distances according to the accumulation method switched by the accumulation method switching unit, and a search result calculation unit which obtains an example sentence string whose similarity obtained by the accumulation calculation unit is high as a search result.

According to a fifth exemplary aspect of the present invention, a computer readable medium for storing a similarity calculation program, the similarity calculation program causing a computer to execute a local distance calculation process of, for two strings, calculating local distances which represent distances between characters which make up the two strings, an accumulation method switching process of switching the accumulation method to recursively accumulate the local distances, based on string delimiter position information which indicates delimiter positions previously added to the strings, and an accumulation calculation process of calculating the similarity between the strings by performing the process of recursively accumulating the local distances according to the accumulation method switched by the accumulation method switching process.

According to a sixth exemplary aspect of the present invention, a computer readable medium for storing a similar sentence search program, the similar sentence search program causing a computer to execute a local distance calculation process of calculating local distances between characters which make up an input string and characters which make up a previously-accumulated example sentence string, an accumulation method switching process of switching the accumulation method to recursively accumulate the local distances, based on string delimiter position information which indicates delimiter positions previously added to the strings, an accumulation calculation process of calculating the similarity by performing the process of recursively accumulating the local distances according to the accumulation method switched by the accumulation method switching process, and a search result calculation process of obtaining the example sentence string whose obtained similarity is high as a search result.

EXEMPLARY EMBODIMENT

An exemplary embodiment of the present invention will now be described with reference to the drawings. In this exemplary embodiment, the basic configuration of a similar sentence search system according to the present invention is the same as the configuration of the similar sentence search system shown in FIG. 1. The similar sentence search system is practically realized by an information processing device, such as a workstation or personal computer. The similar sentence search system can also be realized by an information processing terminal, such as a cell phone or PDA. Moreover, the similar sentence search system may be realized by use of a single information processing device (terminal) or a plurality of information processing devices (terminals).

In this exemplary embodiment, the similar sentence search system can, for example, be applied to an application in which, when a user who wants to create a new sentence, the user searches a database to retrieve similar sentences to the new sentence to be created. By this, the user can create a sentence by consulting similar sentences or foreign language translation sentences with similar meanings. In addition, the similar sentence search system can, for example, be applied to an application in which, when a user is asked a question via email or other means, the user searches a database for similar sentences to the question sentence. By doing so, the user can create an answer based on the search results (similar sentences) and send it back to the sender. Furthermore, the similar sentence search system can, for example, be applied to an application in which a user converts a speech into syllables or the like via a speech recognition process and extracts similar sentences to the result of conversion from a database. In this case, the similar sentence search system can, for example, be applied to an application of speech sentence input devices.

As shown in FIG. 1, the similar text search system includes a similarity calculation unit 1 which calculates the similarity between an input sentence and an example sentence, an example sentence storage unit 2 which stores example sentences to be searched and a similarity storage unit 3 which stores similarities calculated by the similarity calculation unit 1.

The similarity calculation unit 1 has a function to calculate the similarity between an input sentence and each of the example sentences stored in the example sentence storage unit 2. The similarity calculation unit 1 also has a function to pass (or output) the similarity thus obtained to the similarity storage unit 3. In this example, the similarity calculation system is realized by the similarity calculation unit 1.

The example sentence storage unit 2 is practically realized by a storage device, such as a magnetic disc device or optical disc device, and the CPU of an information processing device (terminal) which operates under the control of a program. The example sentence storage unit 2 previously accumulates example sentences to be searched. Example sentences are created and previously accumulated in the example sentence storage unit 2 by the administrator, etc. of the similar sentence search system. The example sentence storage unit 2 has a function to pass (output) the example sentences that it stores, one by one, to the similarity calculation unit 1. For example, the example sentence storage unit 2 stores text data which includes a plurality of example sentences and it extracts and outputs sentences one by one from the text data to the similarity calculation unit 1.

In this exemplary embodiment, the example sentence storage unit 2 stores as example sentences strings to which predetermined delimiter positions have been added. For example, the example sentence storage unit 2 stores as example sentences strings to which information indicating clause delimiter positions have been added. Delimiter positions for strings are previously added by the administrator, etc. of the similar sentence search system.

The similarity storage unit 3 is practically realized by a storage device, such as a magnetic disc device or memory, and the CPU of an information processing device (terminal) which operates under the control of a program. The similarity storage unit 3 stores the similarities calculated by the similarity calculation unit 1. The similarity storage unit 3 also has a function to output example sentences with high stored similarities. In this case, the similarity storage unit 3 identifies example sentences which are similar to the input sentence from among the example sentences stored by the example sentence storage unit 2 based on the stored similarities. The similarity storage unit 3 then obtains the identified example sentences as search results for similar sentences to the inputted string. More specifically, the similarity storage unit 3 obtains an example sentence string corresponding to the highest similarity as a similar sentence search result. Alternatively, the similarity storage unit 3 may obtain a predetermined number of example sentence strings from the highest similarity as similar sentence search results. The similarity storage unit 3 also outputs obtained search results. For example, the similarity storage unit 3 causes example sentences with higher similarities to be displayed on a monitor, such as a display device.

Figure 2:
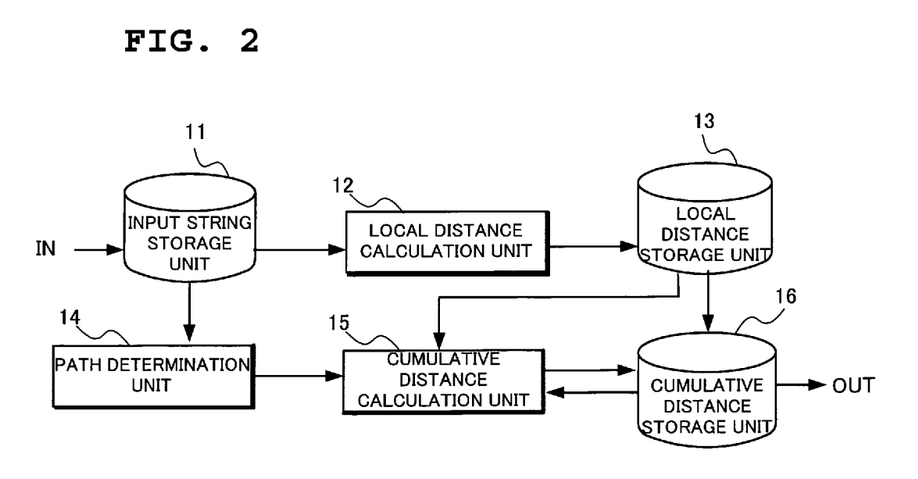
FIG. 2 is a block diagram showing an example of configuration of the similarity calculation unit.

Next, the configuration of the similarity calculation unit 1 will be described. FIG. 2 is a block diagram showing an example of configuration of the similarity calculation unit 1. As shown in FIG. 2, the similarity calculation unit 1 includes an input string storage unit 11, a local distance calculation unit 12, a local distance storage unit 13, a path determination unit 14, a cumulative distance calculation unit 15 and a cumulative distance storage unit 16.

The input string storage unit 11 is practically realized by a storage device, such as a magnetic disc device or memory, and the CPU of an information processing device (terminal) which operates under the control of a program. The input string storage unit 11 stores an input sentence and an example sentence to be subjected to similarity calculation. The input string storage unit 11 has a function to, input an example sentence to be subjected to similarity calculation from the example sentence storage unit 2.

The input string storage unit 11 has a function to input an input sentence to be subjected to similarity calculation. For example, the similar sentence search system has an input device, such as a keyboard and a mouse or a key operation part. In this case, the input string storage unit 11 inputs strings (input sentence) from the input device according to the input operation performed by the user. In addition, when the similar sentence search system has received email, the input string storage unit 11 may extract strings (input sentences) from the received email. The similar sentence search system may also have a voice input device, such as a microphone. In this case, the input string storage unit 11 inputs speeches through the voice input device according to the voice input operation performed by the user. The input string storage unit 11 may then perform a voice recognition process to convert an inputted speech into strings (input sentence).

The local distance calculation unit 12 is practically realized by the CPU of an information processing device (terminal) which operates under the control of a program. The local distance calculation unit 12 has a function to calculate local distances d (i, j), which represent distances between characters contained in strings, based on the strings (strings in an input sentence and an example sentence) stored by the input string storage unit 11. In this exemplary embodiment, the local distance calculation unit 12 obtains local distances which represent distances between characters comprising an inputted string and characters comprising an example sentence string.

The local distance storage unit 13 is practically realized by a storage device, such as a magnetic disc device or memory. The local distance storage unit 13 stores the local distances d (i, j) calculated (obtained) by the local distance calculation unit 12.

The path determination unit 14 is practically realized by the CPU of an information processing device (terminal) which operates under the control of a program. The path determination unit 14 has a function to control the calculation process performed by the cumulative distance calculation unit 15 based on the information of the strings stored by the input string storage unit 11. In this case, the path determination unit 14 switches the accumulation method to recursively accumulate local distances, based on delimiter position information which indicates the delimiter positions previously added to the strings. In this exemplary embodiment, the path determination unit 14 determines which calculation method the cumulative distance calculation unit 15 should use to obtain cumulative distances, based on delimiter position information which indicates the delimiter positions previously added to the strings stored by the input string storage unit 11. For example, the path determination unit 14 may determine the calculation expression to obtain cumulative distances, based on the delimiter positions information added to the strings.

The cumulative distance calculation unit 15 is practically realized by the CPU of an information processing device (terminal) which operates under the control of a program. The cumulative distance calculation unit 15 has a function to calculate the similarity between strings by performing the process of recursively accumulating local distances, according to the accumulation method switched by the path determination unit 14. In this case, the cumulative distance calculation unit 15 obtains a cumulative distance, which is a distance obtained by accumulating the local distances obtained by the local distance calculation unit 12 according to a pre-determined accumulation method. In this exemplary embodiment, the cumulative distance calculation unit 15 calculates a new cumulative distance g (i, j) based on the local distances d (i, j) stored by the local distance storage unit 13 and the cumulative distance g (i, j) stored by the cumulative distance storage unit 16. In other words, in this exemplary embodiment, the cumulative distance calculation unit 15 repeats the process of calculating a cumulative distance g (i, j) in a recursive manner.

The cumulative storage unit 16 is practically realized by a storage device, such as a magnetic disc device or memory, and the CPU of an information processing device (terminal) which operates under the control of a program. The cumulative distance storage unit 16 stores the g (i, j) value calculated by the cumulative distance calculation unit 15. The cumulative distance storage unit 16 also has a function to output g (I, J) to the similarity storage unit 3 as the similarity between the input sentence and the example sentence when cumulative distances for all of points (i, j) have been calculated.

In this exemplary embodiment, the storage device of an information processing device (terminal) which realizes the similar sentence search system stores various programs to cause the process of calculating similarities between strings and the process of searching for example sentences which are similar to a given input sentence (similar sentences) to be executed. For example, the storage device of the information processing device (terminal) stores a similar sentence search program to cause a computer to execute the local distance calculation process of calculating local distances which represent distances between the characters contained in an inputted string and characters contained in an accumulated example sentence string, the accumulation method switching process of switching the accumulation method to recursively accumulate local distances based on delimiter positions information which indicates the delimiter positions previously added to the strings, the accumulation calculation process of first performing the process of recursively accumulate local distances according to the accumulation method switched by the accumulation method switching process and then calculating a similarity, and the search result calculation process of obtaining as search results one or more example sentence strings with high calculated similarity values.

Figure 3:
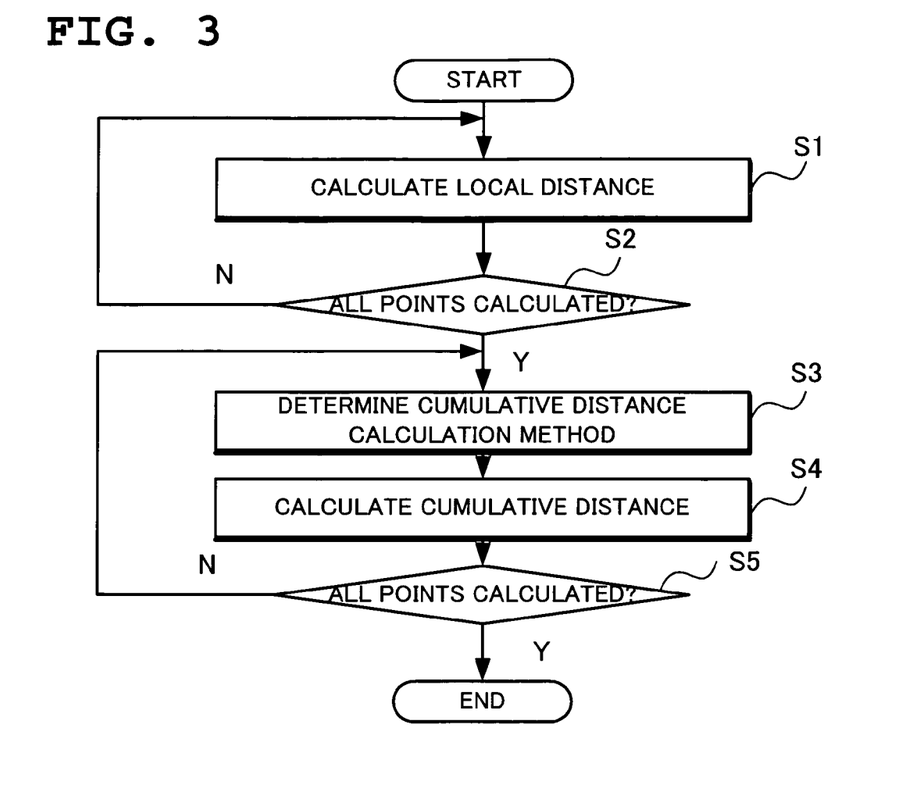
FIG. 3 is a flow chart which shows an example of the similarity calculation process performed by the similarity calculation unit to calculate the similarity between an input sentence and an example sentence.

Next, the operation according to this exemplary embodiment will be described. FIG. 3 is a flow chart which shows an example of the similarity calculation process performed by the similarity calculation unit 1 to calculate the similarity between an input sentence and an example sentence. The operation of the similarity calculation unit 1 will be described below with reference to FIGS. 2 and 3.

The input string storage unit 11 first inputs an input sentence to be subjected to similarity calculation. For example, the input string storage unit 11 inputs an input sentence from the input device according to the input operation performed by the user. In addition, when email is received, the input string storage unit 11 may extract a string (input sentence) from the received email. Also, the input string storage unit 11 may input a speech through the voice input device according to the voice input operation performed by the user. The input string storage unit 11 may then perform a voice recognition process to convert the inputted speech into strings (input sentence).

The input string storage unit 11 inputs an example sentence to be subjected to similarity calculation from the example sentence storage unit 2. The input string storage unit 11 also temporarily stores an input sentence and an example sentence to be subjected to similarity calculation.

Next, the local distance calculation unit 12 calculates the local distance d (i, j) between each element of the input sentence and each element of the example sentence stored in the input string storage unit 11 and causes the obtained local distances to be stored by the local distance storage unit 13 (Step S1 in FIG. 3). The local distance calculation unit 12 determines whether or not local distances d (i, j) for all the points (i, j) have been obtained (Step S2 in FIG. 3). In other words, the local distance calculation unit 12 repeats calculation to obtain local distances until all of d (i, j) has been calculated for all the points (i, j).

Next, the path determination unit 14 reads from the input string storage unit 11 the information concerning the point (i, j) to be subjected to calculation by the cumulative distance calculation unit 15. For example, the path determination unit 14 reads the information of delimiter positions which has previously been added to the string and is stored by the input string storage unit 11. Based on the information which it has read, the path determination unit 14 then determines which calculation method should be used by the cumulative distance calculation unit 15 to obtain cumulative distances (Step S3 in FIG. 3).

Next, the cumulative distance calculation unit 15 calculates cumulative distances g (i, j) according to the calculation method previously determined by the path determination unit 14 and causes the calculation results (obtained cumulative distances) to be stored by the cumulative distance storage unit 16 (Step S4 in FIG. 3). The cumulative distance calculation unit 15 determines whether or not cumulative distances g (i, j) for all the points (i, j) have been obtained (Step S5 in FIG. 3). In other words, the similar sentence search system recursively repeats calculation to obtain g (i, j) until all of the points (i, j) have been calculated. In this case, the similar sentence search system repeats the processes of Steps S3 and S4 for all of the points (i, j) in the order indicated in the expression (2).

$$(i,j)=(1,1),(2,1),\ldots,(I,1),(1,2),(2,2),\ldots,(I,J-1),(I,J) \quad \text{Expression (2)}$$

Finally, if it is determined at Step S5 that calculation of cumulative distances has been completed for all of the points (i, j), the cumulative distance storage unit 16 outputs to the similarity storage unit 3 the value of g (i, j) which it stores as the similarity between the input sentence and the example sentence and completes the process.

The similarity storage unit 3 stores the similarity (g (I, J)) inputted from the cumulative distance storage unit 16. The similarity storage unit 3 identifies example sentences which are similar to the input sentence from among the example sentences stored by the example sentence storage unit 2 based on the stored similarities. The similarity storage unit 3 then outputs the identified example sentences as example sentences with high similarities to the inputted string. For example, the similarity storage unit 3 causes the identified example sentences to be displayed on a monitor, such as a display device.

As described in the foregoing, according to this exemplary embodiment, the similar sentence search system can obtain a more accurate similarity by referencing delimitation information of the example sentences during similarity calculation. More specifically, the path determination unit 14 determines the calculation method to obtain cumulative distances, based on the delimiter position information previously added to the example sentence string. The cumulative distance calculation unit 15 obtains cumulative distances according to the calculation method determined by the path determination unit 14 and then obtains the similarity between the inputted string and each of the example sentence strings. The similarity storage unit 3 obtains search results for similar sentences which are similar to the inputted string based on the obtained similarities. Therefore, similar sentences can be searched with higher accuracy. More specifically, similar sentences can be searched with higher accuracy because search results can be calculated based on more accurate similarities when compared with obtaining similarities without taking delimiter positions within example sentence strings into account.

EXAMPLE

The operation of the similar sentence search system will now be explained by using a concrete example. The similar sentence search system first inputs, for example, a string "KYU U KA KU DA SA I" as an input sentence. The similar sentence search system then reads one of the example sentences stored in the example sentence storage unit 2 and passes it, together with the input sentence, to the similarity calculation unit 1.

Figure 4:
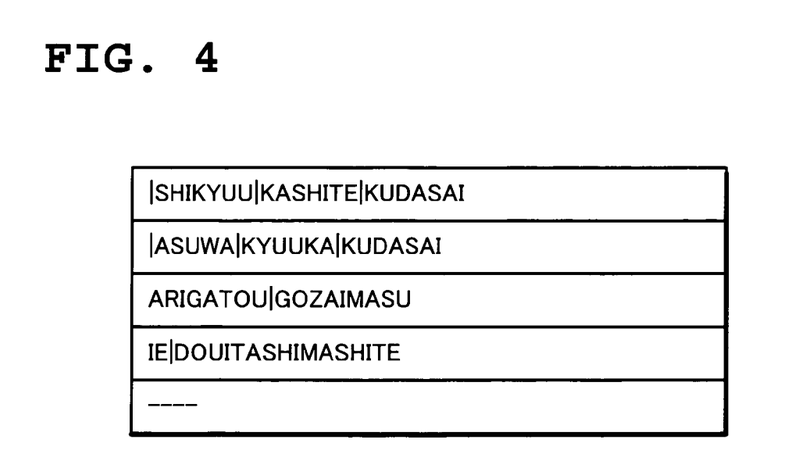
FIG. 4 is an illustrative diagram which shows examples of example sentences which are previously stored by the example sentence storage unit.

FIG. 4 is an illustrative diagram which shows examples of example sentences which are previously stored by the example sentence storage unit 2. The example sentence storage unit 2 previously stores example sentences to which information indicating pre-determined delimiter positions has been added. In the example shown in FIG. 4, the example sentence storage unit 2 stores example sentences to which the symbol "|" has been added as information indicating delimiter positions. Each symbol "|" in the example sentences indicates delimitation between two adjacent clauses. In the description hereafter, an example of operation which takes place during similarity calculation will be explained by taking as an example the first string "|SHIKYU-U|KASHITE|KUDASAI" within the example sentences shown in FIG. 4.

When an input sentence and an example sentence are given, the input sentence and the example sentence are temporarily stored in the input string storage unit 11. In this case, the input string storage unit 11 stores the symbol "|" which indicates a delimitation between two adjacent clauses within each example sentence, separately from the other characters in such sentence. For example, when the input string storage unit 11 stores the string "|SHIKYUU|KASHITE|KUDASAI," it stores the string "SHIKYUU-KASHITE-KUDASAI" and (0, 3, 6), i.e., the information which indicates the positions of clause delimiters within the string (delimiter position information), separately from each other. The string is used when the local distance calculation unit 12 obtains local distances. The delimiter position information is used by the path determination unit 14 when it determines which calculation method should be used to obtain cumulative distances.

Next, the local distance calculation unit 12 calculates local distances d (i, j) between the input sentence "KYUUKA-KUDASAI" and the example sentence "SHIKYUU-KASHITE-KUDASAI." In this exemplary embodiment, the local distance calculation unit 12 obtains d (i, j)=0 if x [i] and y [j] are the same character. The local distance calculation unit 12 obtains d (i, j)=1 if x [i] and y [j] are not the same character. However, when x [i] and y [j] are different characters but they have the same vowel (e.g. "KA" and "SA"), the local distance calculation unit 12 may obtain, for example, d (i, j)=0.5 through more granular calculation.

FIG. 5 is an illustrative diagram which shows examples of the calculation results of local distances obtained by the local distance calculation unit 12. The local distance calculation unit 12 causes all the calculation results for local distances to be stored in the local distance storage unit 13.

Next, the path determination unit 14 determines which calculation method the calculation unit 15 should use to calculate cumulative distances. In the description below, each clause delimiter position within the example sentence is represented as k [n]. In this exemplary embodiment, the path determination unit 14 identifies k[0]=1, k [1]=3, k [2]=6, based on the positions of clause delimiters which are indicated by the delimiter position information stored by the input string storage unit 11. Using the identified k [n], the path determination unit 14 then determines the calculation method for cumulative distances g (i, j) to be used. In this example, using the identified k [n], the path determination unit 14 determines that the calculation method for cumulative distances g (i, j) should be the one shown below.

$$g(i,j)=\min\{g(i,j-1)+d(i,j),g(i-1,j-1)+2d(i,j),g(k[n-1],j)+(k[n]-k[n-1])+d(i,j)\} \text{ (in the case of } i=k\ [n])$$

$$g(i,j)=g(i-1,j-1)+2d(i,j) \text{ (in the case of other than } i=k\ [n]) \quad \text{Expression (3)}$$

Next, the cumulative distance calculation unit 15 calculates cumulative distance g (i, j) using the calculation expression determined by the path determination unit 14. The cumulative distance calculation unit 15 performs the cumulative distance calculation on all of the points (i, j) which satisfy $1 \leq i \leq I$ and $1 \leq j \leq J$. In this case, the cumulative distance calculation unit 15 obtains cumulative distances in the order of calculation as follows:

(a) In the cumulative distance calculation process, the cumulative distance calculation unit 15 obtains cumulative distances g (1,1), beginning with (i, j)=(1, 1); (b) As it increments the value of "i" by 1, the cumulative distance calculation unit 15 sequentially obtains cumulative distances (i, j); and (c) When i=I is reached, the cumulative distance calculation unit 15 increments the value of "j" by 1 and returns the value of "i" to 1 and resumes calculation to obtain cumulative distances (i, j). By repeating the steps (b) and (c) above, the cumulative distance calculation unit 15 obtains cumulative distance g (i, j) for all the points (i, j). The cumulative distance calculation unit 15 causes the calculation results for cumulative distances to be stored by the cumulative distance storage unit 16.

The cumulative distance storage unit 16 previously stores the values shown in Expression (4) as the initial values of g (i, j). When it begins the calculation process for cumulative distances, the cumulative distance calculation unit 15 calculates a new cumulative distance based on the initial values stored by the cumulative distance storage unit 16.

$$g(i,j)=i \text{ (in the case of } j=0)$$

$$g(i,j)=j \text{ (in the case of } i=0) \quad \text{Expression (4)}$$

Figure 6:
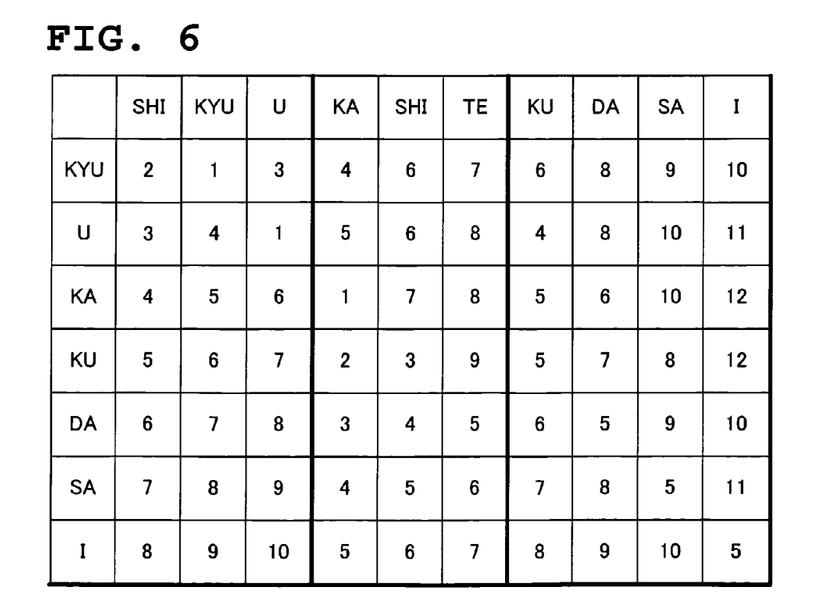
FIG. 6 is an illustrative diagram which shows examples of calculation results of g (i, j) obtained by the cumulative distance calculation unit.

FIG. 6 is an illustrative diagram which shows examples of calculation results of cumulative distances g (i, j) calculated by the cumulative distance calculation unit 15. Based on the calculation results shown in FIG. 6, the cumulative distance storage unit 16 obtains and outputs "5" as the similarity between the input sentence "KYU U KA KU DA SA I" and the example sentence "|SHIKYUU|KASHITE|KUDASAI" (the value at the lowest rightmost box shown in FIG. 6).

Figure 8:
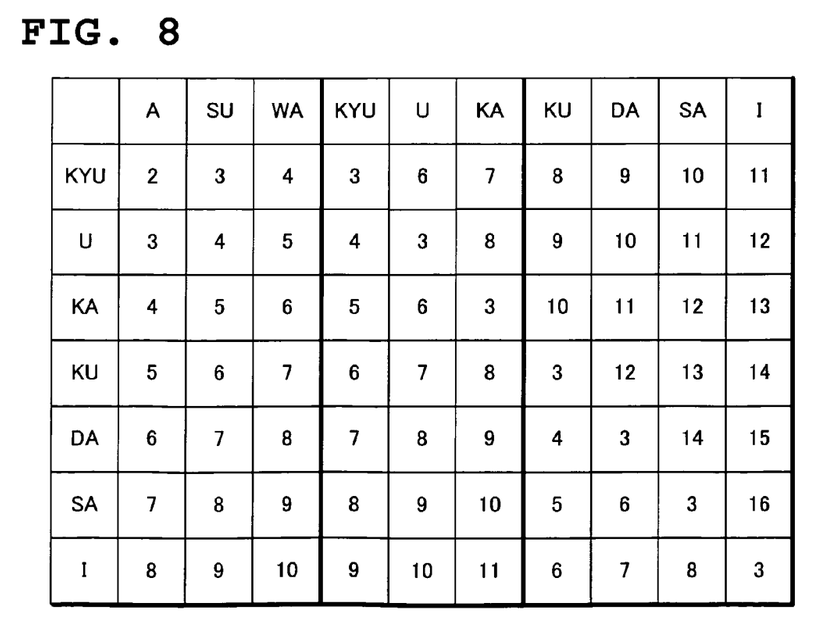
FIG. 8 is an illustrative diagram which shows examples of other calculation results of g (i, j) obtained by the cumulative distance calculation unit.

Following the same process, the similarity calculation unit 1 then calculates the similarity for the next example sentence "|ASUWA|KYUUKA|KUDASAI" shown in FIG. 4. In this case, the local distance calculation unit 12 obtains local distances d (i, j) as shown in FIG. 7. Also, the local distance calculation unit 15 obtains cumulative distances g (i, j) as shown in FIG. 8. Then, based on the calculation results shown in FIG. 8, the cumulative distance storage unit 16 obtains and outputs "3" as the similarity between the input sentence "KYU U KA KU DA SA I" and the example sentence "|ASUWA|KYUUKA|KUDASAI" (the value at the lowest rightmost box shown in FIG. 8). At the same time, the similarity calculation unit 1 causes these similarities thus obtained to be stored by the similarity storage unit 3.

In this exemplary embodiment, a smaller similarity value outputted by the cumulative distance storage unit 16 represents a higher similarity between an input sentence and an example sentence (i.e., they are more similar). For the two sample example sentences described above, the similarity value "3" obtained based on the example sentence "|ASUWA|KYUUKA|KUDASAI" is smaller than the similarity value "5" obtained based on the example sentence "|SHIKYUU|KASHITE|KUDASAI" and thus the former example sentence has a higher similarity than the latter. Therefore, it can be known that, in the example sentences described above, the example sentence "|ASUWA|KYUUKA|KUDASAI" is more similar to the input sentence "KYU U KA KU DA SA I" than the example sentence "|SHIKYUU|KASHITE|KUDASAI."

The similarity calculation unit 1 performs the same process on all the example sentences stored by the example sentence storage unit 2 to calculate their similarities and causes them to be stored by the similarity storage unit 3. The similarity storage unit 3 then outputs the example sentence corresponding to the smallest similarity value (i.e., the example sentence with the highest similarity to the input sentence) as a search result. For example, the similarity storage unit 3 may cause the example sentence with the highest similarity to the input sentence to be displayed on a monitor.

According to the exemplary embodiment of the present invention, accurate similarities can be obtained by adopting the configuration as described above. In this configuration, clause or other information which indicates delimitations for the sentence is previously added to an example sentence string, and cumulative distances are calculated by switching the cumulative distance calculation method as appropriate based on the delimitation information. Therefore, the objects of the present invention to enable highly accurate search for similar sentences can be achieved.

According to the exemplary embodiment of the present invention, a similarity between two strings is calculated by switching the accumulation method to recursively accumulate local distances based on the delimiter position information previously added to the strings and performing a process of recursively accumulating local distances according to the switched accumulation method. Therefore, a more accurate similarity can be obtained by referencing delimitation information within example sentences during similarity calculation.

Also, according to the exemplary embodiment of the present invention, similar sentence search results are obtained based on the similarity obtained by following the switched accumulation method. Therefore, similar sentences can be searched with higher accuracy. More specifically, similar sentences can be searched with higher accuracy because search results can be calculated based on more accurate similarities when compared with obtaining similarities without taking delimiter positions within strings into account.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-358021, filed on Dec. 12, 2005, the disclosure of which is incorporated herein in its entirety by reference.

INDUSTRIAL APPLICABILITY

The present invention can be applied to an application in which a user searches for similar sentences to a sentence which the user wants to create from a database. By this, the user can create a sentence by consulting similar sentences or foreign language translations with similar meanings. In addition, the present invention can be applied to an application in which, when a user is asked a question via email or other means, the user retrieves similar sentences to the question sentence from a database. By doing so, the user can create an answer based on the search results and send it back to the sender. Furthermore, the present invention can be applied to an application in which a user converts a speech into syllables or the like via a speech recognition process and extracts similar sentences to the result of conversion from a database. The invention can also be applied to an application of voice-driven text input devices.

The invention claimed is:

1. A computer-implemented similarity calculation method, comprising the steps of:
   a local distance calculating step, for two strings, in which a computer calculates local distances which represent distances between characters which make up the two strings;
   a switching step in which the computer switches the accumulation method to recursively accumulate said local distances, based on string delimiter position information which indicates delimiter positions previously added to the strings; and
   an accumulation calculating step in which the computer calculates the similarity between the strings by performing the process of recursively accumulating said local distances according to said switched accumulation method.

2. A computer-implemented similar sentence search method, comprising the steps of:
   a local distance calculating step in which a computer calculates local distances between characters which make up an input string and characters which make up a previously-accumulated example sentence string;
   a switching step in which the computer switches the accumulation method to recursively accumulate said local distances, based on string delimiter position information which indicates delimiter positions previously added to the example sentence string;
   an accumulation calculating step in which the computer calculates the similarity between the input string and the example sentence string by performing the process of recursively accumulating said local distances according to said switched accumulation method; and a search result calculation step in which the computer obtains said example sentence string whose obtained similarity is high as a search result.

3. A similarity calculation system, comprising:

a local distance calculation unit which, for two strings, calculating local distances which represent distances between characters which make up the two strings;

an accumulation method switching unit which switches the accumulation method to recursively accumulate the local distances calculated by said local distance calculation unit, based on string delimiter position information which indicates delimiter positions previously added to the strings; and an accumulation calculation unit which calculates the similarity between the strings by performing the process of recursively accumulating said local distances according to the accumulation method switched by said accumulation method switching unit.

4. A similar sentence search system, comprising:

a local distance calculation unit which calculates local distances between characters which make up an input string and characters which make up a previously-accumulated example sentence string;

an accumulation method switching unit which switches the accumulation method to recursively accumulate the local distances calculated by said local distance calculation unit, based on string delimiter position information which indicates delimiter positions previously added to the strings;

an accumulation calculation unit which calculates the similarity between the strings by performing the process of recursively accumulating said local distances according to the accumulation method switched by said accumulation method switching unit; and a search result calculation unit which obtains an example sentence string whose similarity obtained by said accumulation calculation unit is high as a search result.

5. The similar sentence search system of claim 4, wherein the cumulative calculation unit obtains cumulative distances by accumulating the local distances calculated by the local distance calculation unit according to the pre-determined accumulation method.

6. The similar sentence search system of claim 5, wherein the accumulation method switching unit switches the accumulation method to recursively accumulate local distances by determining the calculation method to obtain cumulative distances based on string delimiter position information; and the cumulative calculation unit obtains cumulative distances according to the calculation method determined by said accumulation method switching unit.

7. The similar sentence search system of claim 6, wherein the accumulation method switching unit determines the calculation expression to obtain cumulative distances as the method to obtain cumulative distances based on string delimiter position information; and the cumulative calculation unit obtains cumulative distances according to the calculation expression determined by said accumulation method switching unit.

8. The similar sentence search system of claim 4, comprising an example sentence storage unit which previously stores a plurality of example sentence strings to which delimiter position information has previously been added; and wherein the accumulation method switching unit switches the accumulation method to recursively accumulate local distances based on string delimiter position information which indicates delimiter positions added to the strings and which is stored by said example sentence storage unit.

9. The similar sentence search system of claim 8, wherein the search result calculation unit obtains, as similar sentence search results similar to the input string, example sentence strings corresponding to high similarities, obtained by the accumulation calculation unit, which are among the example sentence strings stored by the example sentence storage unit.

10. The similar sentence search system of claim 4, comprising a voice input unit which inputs voice; and a voice recognition unit which converts a speech inputted by said voice input unit into an input string by performing voice recognition; and wherein the local distance calculation unit calculates local distances based on the input string which has resulted from conversion by said voice recognition unit.

11. A non-transitory computer readable medium for storing a similarity calculation program, wherein execution of the similarity calculation program by a computer causes the computer to execute:

a local distance calculation process of, for two strings, calculating local distances which represent distances between characters which make up the two strings;

an accumulation method switching process of switching the accumulation method to recursively accumulate said local distances, based on string delimiter position information which indicates delimiter positions previously added to the strings; and an accumulation calculation process of calculating the similarity between the strings by performing the process of recursively accumulating said local distances according to the accumulation method switched by said accumulation method switching process.

12. A non-transitory computer readable medium for storing a similar sentence search program, wherein execution of the similar sentence search program by a computer causes the computer to execute:

a local distance calculation process of calculating local distances between characters which make up an input string and characters which make up a previously-accumulated example sentence string;

an accumulation method switching process of switching the accumulation method to recursively accumulate said local distances, based on string delimiter position information which indicates delimiter positions previously added to the strings;

an accumulation calculation process of calculating the similarity by performing the process of recursively accumulating said local distances according to the accumulation method switched by said accumulation method switching process; and a search result calculation process of obtaining said example sentence string whose obtained similarity is high as a search result.

* * * * *